(12) United States Patent
Jeon

(10) Patent No.: US 7,515,221 B2
(45) Date of Patent: Apr. 7, 2009

(54) LIQUID CRYSTAL DISPLAY DEVICE

(75) Inventor: Sung Hyun Jeon, Daegu (KR)

(73) Assignee: LG Display Co., Ltd., Seoul (KR)

( * ) Notice: Subject to any disclaimer, the term of this patent is extended or adjusted under 35 U.S.C. 154(b) by 336 days.

(21) Appl. No.: 11/440,003

(22) Filed: May 25, 2006

(65) Prior Publication Data

US 2006/0290834 A1 Dec. 28, 2006

(30) Foreign Application Priority Data

Jun. 22, 2005 (KR) ............... 10-2005-0054199

(51) Int. Cl.
*G02F 1/1333* (2006.01)
(52) U.S. Cl. ........................... 349/58; 362/633

(58) Field of Classification Search ............. 349/58–60; 362/632–634
See application file for complete search history.

(56) References Cited

U.S. PATENT DOCUMENTS

| 7,134,780 | B2 * | 11/2006 | Tsai ............................ 362/633 |
| 2004/0119906 | A1 * | 6/2004 | Hong et al. ................... 349/58 |
| 2004/0212755 | A1 * | 10/2004 | Fukayama et al. ............ 349/58 |
| 2005/0264714 | A1 * | 12/2005 | Hwang et al. ................. 349/58 |

* cited by examiner

*Primary Examiner*—Thoi V Duong
(74) *Attorney, Agent, or Firm*—Birch, Stewart, Kolasch & Birch, LLP

(57) ABSTRACT

A liquid crystal display device includes a liquid crystal display panel; and a case for supporting the liquid crystal display panel, the case having a bottom cover, the bottom cover has an adjustable size based on a size of the liquid crystal display panel for accommodating the liquid crystal display panel.

19 Claims, 4 Drawing Sheets

LIQUID CRYSTAL DISPLAY DEVICE

This Nonprovisional Application claims priority under 35, U.S.C. §119(a) on Patent Application No. 10-2005-0054199, filed in Korea on Jun. 22, 2005, the entire contents of which are hereby incorporated by reference.

BACKGROUND OF THE INVENTION

1. Field of the Invention

The present invention relates to a liquid crystal display device, and more particularly to a liquid crystal display device having a bottom cover that is adaptive for accommodating a liquid crystal display panel regardless of the size of the liquid crystal display panel.

2. Description of the Related Art

A liquid crystal display (hereinafter, referred to as 'LCD') device is a flat panel display device which controls the light transmittance of a light beam in response to a video signal, thereby displaying a picture. Specifically, the LCD has been widely applied due to its superior characteristics such as lightness, thinness, low power consumption driving, etc. For example, the LCD has been applied as a display device of a notebook computer and an office automation device. Further, there is a strong demand for a large-size LCD to satisfy the consumers.

Referring to FIG. 1, a liquid crystal display device of the related art includes a liquid crystal display panel 2; a backlight unit for irradiating light to the liquid crystal display panel 2; a support main or support frame 4 for housing the liquid crystal display panel 2 and the backlight unit; a cover bottom or bottom cover 16 which is at the bottom side of the support frame 4 to fix the backlight unit and supports the support frame 4; and a case top or top cover 6 which encompasses an edge of the liquid crystal display panel 2 and a side wall of the support frame 4.

The liquid crystal display panel 2 has liquid crystal cells arranged as an active matrix between upper and lower substrates, and a thin film transistor installed at each of the liquid crystal cells for switching a video signal. The refractive index of each of the liquid crystal cells is changed in accordance with a video signal to display a picture corresponding to the video signal. A gate driver circuit board 3A and a data driver circuit board 3B for applying drive signals to the thin film transistor are mounted on a lower substrate of the liquid crystal display panel 2. Further, polarizing sheets are respectively installed in front and rear surfaces of the liquid crystal display panel 2.

The backlight unit includes a lamp assembly 36 for receiving power from an external power supply to irradiate light to the liquid crystal display panel 2; a light guide panel 12 which guides the light exiting from the lamp assembly 36 toward the liquid crystal display panel 2; a reflection sheet 14 arranged in a rear surface of the light guide panel 12; and a plurality of optical sheets 10 for improving the efficiency of the light exiting from the light guide panel 12 toward the liquid crystal display panel 2.

The lamp assembly 36 includes a lamp 33 and a lamp housing 35 for protecting the lamp 33, and acts as a light source which supplies the light to the liquid crystal display panel 2. Specifically, the lamp housing 35 increases the efficiency of the light irradiated from the lamp to prevent the loss of the light.

The light guide panel 12 guides the light incident from the lamp assembly 36 with a fixed tilt angle to the liquid crystal display panel 2. At this moment, the reflection sheet 14 guides the light generated from the lamp 33 toward the light guide panel 12 and prevents the loss of the light generated from the lamp 33.

The optical sheets 10 direct the light slantingly incident from the surface of the light guide panel 12 and the reflection sheet 14 to vertically proceed to the liquid crystal display panel 2. In other words, the optical sheets 10 act to erect the direction of the light from the surface of the optical sheets 10.

The top cover 6 is made in a square band shape to have a plane part and a side part which are bent at a right angle. The top cover 6 encompasses the edge of the liquid crystal display panel 2 and the side of the support frame 4.

The backlight unit and the liquid crystal display panel 2 are deposited on the support frame 4.

The bottom cover 16 is combined with the support frame 4 to protect the backlight unit and the liquid crystal display penal 2 and to support the support frame 4. Specifically, the bottom cover 16 is located at the lowest surface of the liquid crystal display device and made from a metal material to reinforce the strength of the support frame 4 formed from a plastic material.

On the other hand, as the size of the liquid crystal display panel 2 of the related art increases, the backlight unit, the bottom cover 16, etc. have to become larger accordingly to fit the size of the liquid crystal display panel 2. In other words, the bottom cover 16 need to be redesigned in accordance with the change of the size of the liquid crystal display panel 2. Therefore, the manufacturing cost of the liquid crystal display device is increased.

SUMMARY OF THE INVENTION

Accordingly, it is an object of the present invention to provide a liquid crystal display device having a bottom cover that is adaptive for accommodating a liquid crystal display panel regardless of the size of the liquid crystal display panel.

In order to achieve these and other objects of the invention, a liquid crystal display device according to an aspect of the present invention, as embodied, includes a liquid crystal display panel; and a case for supporting the liquid crystal display panel, the case having a bottom cover, the bottom cover has an adjustable size based on a size of the liquid crystal display panel, for accommodating the liquid crystal display panel.

In another aspect of the present invention, a liquid crystal display device, as embodied, includes a liquid crystal display panel; and a case for supporting the liquid crystal display panel, the case having a cover, wherein the cover includes: an outer plate having a fixed size; and an inner plate for accommodating the liquid crystal display panel, the inner plate being surrounded by the outer plate, the inner plate having an adjustable size based on a size of the liquid crystal display panel.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE ILLUSTRATED EMBODIMENTS

Reference will now be made in detail to the embodiments of the present invention, examples of which are illustrated in the accompanying drawings.

Figure 1:
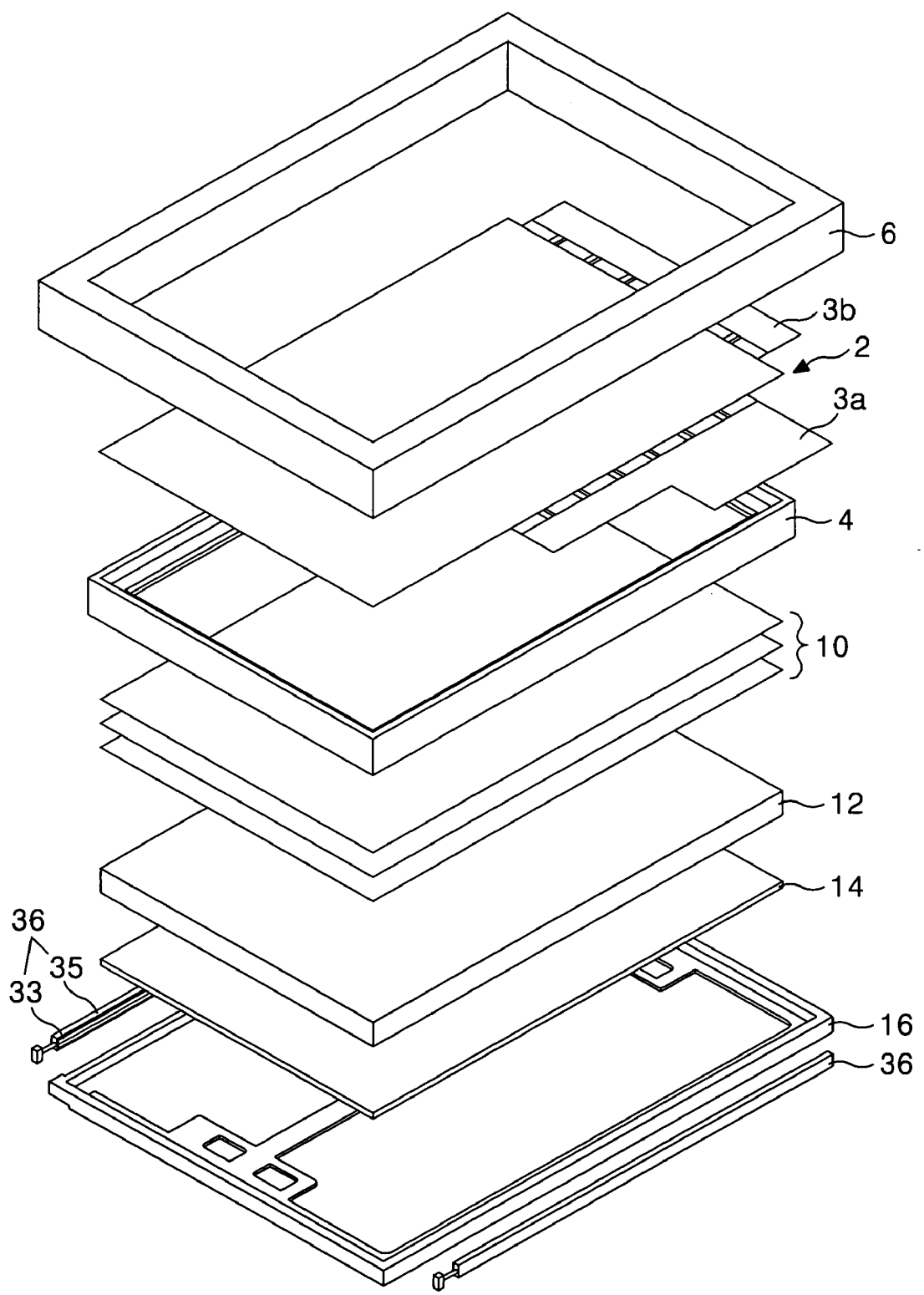
FIG. 1 is an exploded perspective plan view of a liquid crystal display device of the related art.
Figure 2:
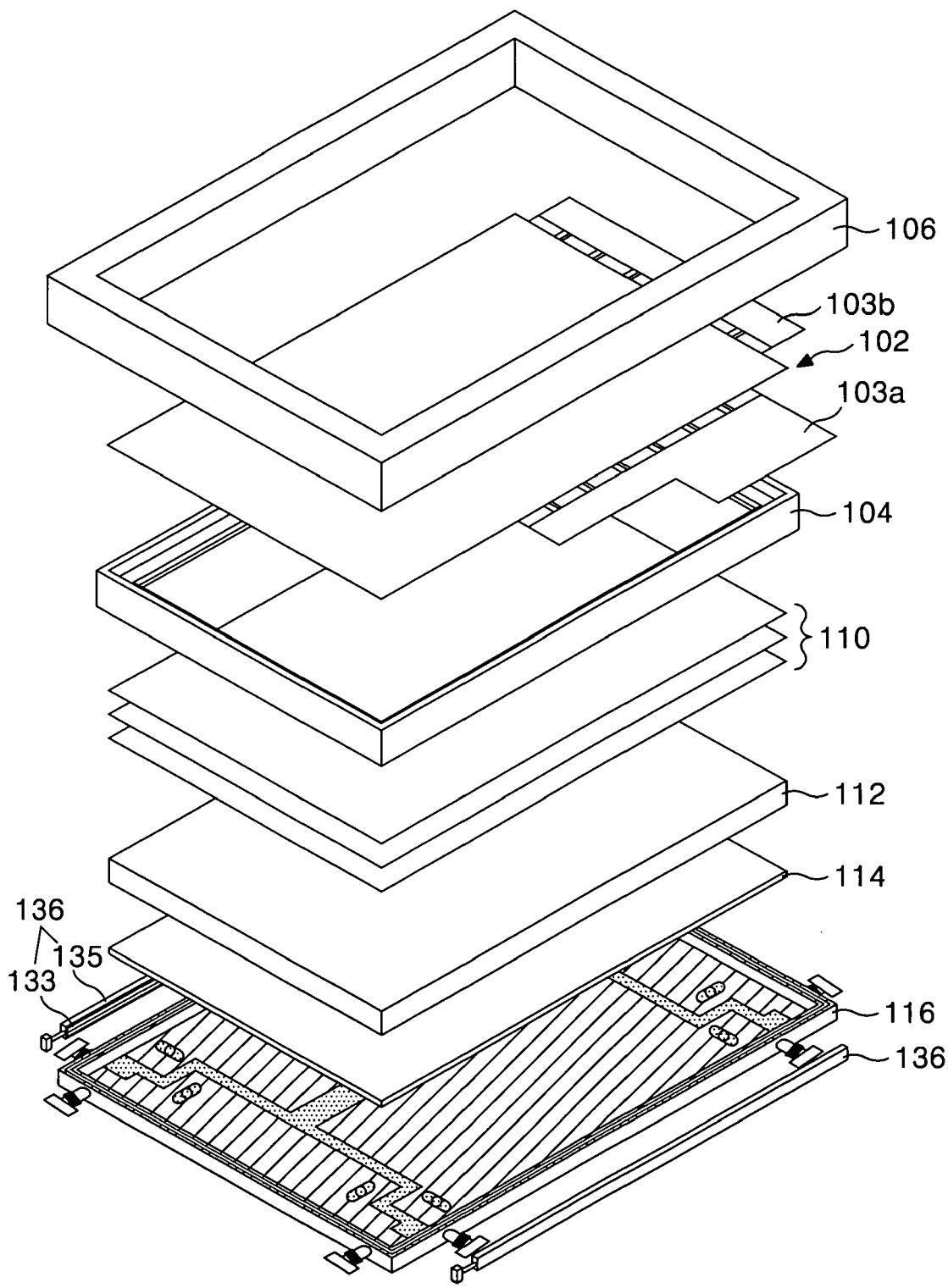
FIG. 2 is an exploded perspective plan view of a liquid crystal display device according to an embodiment of the present invention.
Figure 3:
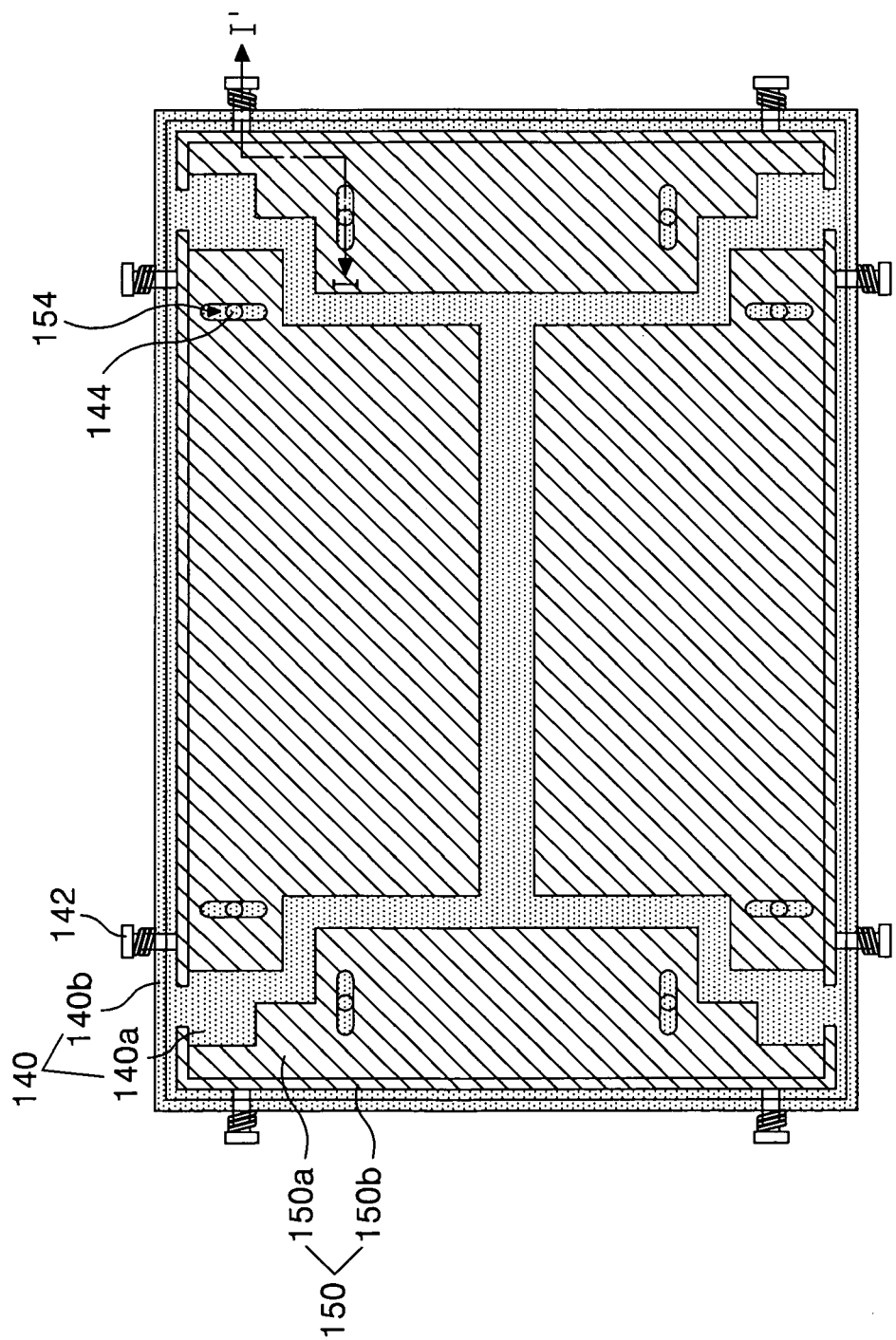
FIG. 3 is a plan view of a bottom cover shown in FIG. 2.
Figure 4:
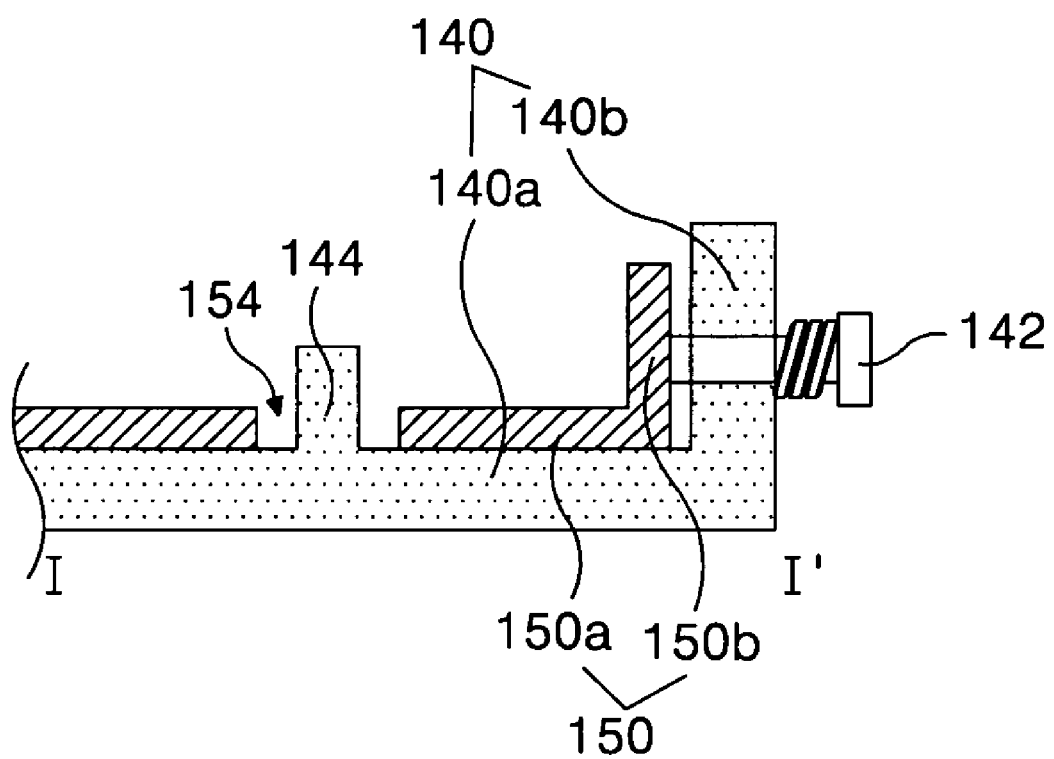
FIG. 4 is a cross sectional view illustrating the bottom cover shown in FIG. 3, taken along the line I-I'.

With reference to FIGS. 2 to 4, embodiments of the present invention will be explained as follows.

FIG. 2 is an exploded perspective plan view of a liquid crystal display device according to an embodiment of the present invention.

Referring to FIG. 2, the liquid crystal display device includes a liquid crystal display panel 102; a backlight unit for irradiating light to the liquid crystal display panel 102; a support main or support frame 104 for housing the liquid crystal display panel 102 and the backlight unit; a cover bottom or bottom cover 116 combined with one side of the support frame 104 to fix the backlight unit and to support the support frame 104; and a case top or top cover 106 which encompasses the edge of the liquid crystal display panel 102 and the side wall of the support frame 104.

The liquid crystal display panel 102 has liquid crystal cells arranged as an active matrix between upper and lower substrates, and a thin film transistor installed at each of the liquid crystal cells for switching a video signal. The refractive index of each of the liquid crystal cells is changed in accordance with the video signal, thereby displaying a picture corresponding to the video signal. A gate driver circuit board and a data driver circuit board for applying a drive signal to the thin film transistor are mounted on a lower substrate of the liquid crystal display panel 102. Further, a polarizing sheet can be installed in each of front and rear surfaces of the liquid crystal display panel 102.

The backlight unit includes a lamp assembly 136 for receiving power from an external power supply to irradiate light to the liquid crystal display panel 102; a light guide panel 112 which guides the light exiting from the lamp assembly 136 toward the liquid crystal display panel 102; a reflection sheet 114 arranged in a rear surface of the light guide panel 112; and a plurality of optical sheets 110 for improving the efficiency of the light exiting from the light guide panel 112 toward the liquid crystal display panel 102.

The lamp assembly 136 includes a lamp 133 and a lamp housing 135 for protecting the lamp 133, and acts as a light source which supplies the light to the liquid crystal display panel 102. Specifically, the lamp housing 135 increases the efficiency of the light irradiated from the lamp to prevent the loss of the light.

The light guide panel 112 guides the light incident from the lamp assembly 136 with a fixed tilt angle to the liquid crystal display panel 102. At this moment, the reflection sheet 114 guides the light generated from the lamp 133 toward the light guide panel 112 and prevents the loss of the light generated from the lamp 133.

The optical sheets 110 direct the light slantingly incident from the surface of the light guide panel 112 and the reflection sheet 114 to vertically proceed to the liquid crystal display panel 102. In other words, the optical sheets 110 act to erect the direction of the light from the surface of the optical sheets 110.

The top cover 106 is made in a square band shape to have a plane part and a side part which are bent at a right angle. The top cover 106 encompasses the edge of the liquid crystal display panel 102 and the side of the support frame 104.

The backlight unit and the liquid crystal display panel 102 are deposited on the support frame 104.

The bottom cover 116 is combined with the support frame 104 to protect the backlight unit and the liquid crystal display penal 102 and to support the support frame 104. Specifically, the bottom cover 116 is located at the lowest surface of the liquid crystal display device and made from a metal material to act to reinforce the solidity of the support frame 104 formed from a plastic material.

The bottom cover 116 includes a base plate, and a slidable plate which is overlapped with the base plate and formed to be able to horizontally slide on the base plate. The bottom cover 116 has the slidable plate which can slide to adjust its size in order to accommodate any liquid crystal display panel regardless of the size of the liquid crystal display panel.

In reference to FIGS. 3 and 4, the bottom cover will be more specifically explained as follows.

FIG. 3 is a plan view specifically illustrating a bottom cover shown in FIG. 2, and FIG. 4 is a cross sectional view illustrating the bottom cover taken along the line I-I' of FIG. 3.

The bottom cover 116 shown in FIGS. 3 and 4 includes a base plate 140 with a fixed size and a slidable plate 150 which can horizontally slide on the base plate 140 to adjust its size in accordance with the size of the liquid crystal display panel 2.

The base plate 140 includes a base plane 140a located at the bottom surface; a base vertical sidewall 140b extending from the circumference of the base plane 140a; a screw 142 which passes through the base vertical sidewall 140b to be in contact with the slidable plate 150; and a protrusion 144 formed to project from the base plane 140a to define a sliding range of the slidable plate 150 and to prevent the slidable plate 150 from escaping from the base plate 140. As shown in FIGS. 3 and 4, the slidable plate 150 is slidable within an area surrounded by the outer, base plate 140.

The slidable plate 150 includes a plurality of sub slidable plates 150 which can each slide independently. In the illustrated embodiment, there are, but not limited to, four sub slidable plates 150. Based on the degree of the adjustment, any number of the sub slidable plate(s) 150 can be used. Each of the sub slidable plates 150 includes a sub-plane 150a which can slide horizontally on the base plane 140a by a sliding method; and a vertical sidewall 150b extending from the sub-plane 150a and to move together with the sub-plane 150a by the pushing or pulling of a screw 142. In each of the sub-planes 150a, the protrusion 144 projecting from the base plane 140a passes through a groove 154 of the sub-plane 150a. Therefore, the sub-plane 150a can only move with the range of the groove 154. In other words, the base vertical sidewall 150b of the base plate 140 acts to prevent the escape of the slidable plate from the side, and the protrusion 144 acts to set the sliding range of the slidable plate.

The bottom cover 116 with such a structure can control the size surrounded by the slidable plate 150. Therefore, the bottom cover 116 can be applied to any liquid crystal display panel 2 regardless of the size of the liquid crystal display panel 2. In other words, by moving the screw 142 forward, the size surrounded by the slidable plate 150 is smaller for accommodating a smaller-size liquid crystal display panel 2; by moving the screw 142 backward, the size surrounded by the slidable plate 150 is larger for accommodating a larger-size liquid crystal display panel. Therefore, the size of the bottom cover 116, to be more specifically, the size surrounded by the slidable plate 150 can be adjusted in accordance with the size of the liquid crystal display panel 102. As a result, even though the liquid crystal display panel 2 is changed, it is not necessary to redesign or manufacture a new bottom cover 116. Therefore, the present invention can be applied to any liquid crystal display panel 2 regardless of the size of the liquid crystal display panel 2.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A liquid crystal display device, comprising:
   a liquid crystal display panel;
   a case for supporting the liquid crystal display panel; and
   a bottom cover being combined with the ease and including a base plate and a slidable plate,
   wherein the slidable plate has an adjustable size based on a size of the liquid crystal display panel and at least one groove along a sliding direction of the slidable plate, and
   wherein the base plate includes at least one protrusion through the at least one groove, a slidable range of the slidable plate being limited by a length of the groove.

2. The liquid crystal display device according to claim 1, wherein the bottom cover includes:
   the base plate having a fixed size; and
   the slidable plate having the adjustable size for accommodating the liquid crystal display panel, the slidable plate being horizontally slidable on the base plate to adjust the size of the liquid crystal display panel.

3. The liquid crystal display device according to claim 2, further comprising:
   an adjusting device on the base plate for adjusting slide of the slidable plate.

4. The liquid crystal display device according to claim 2, wherein the slidable plate includes a plurality of sub slidable plates, each of the sub slidable plates being slidable independently.

5. The liquid crystal display device according to claim 4, wherein each of the sub slidable plates includes:
   a sub-plane horizontally slidable on the base plate; and
   a sidewall vertical extending from the sub-plate.

6. The liquid crystal display device according to claim 5, further comprising:
   an adjusting device on the base plate, the adjusting device being in contact with the sidewall of at least one of the sub slidable plates to horizontally slide the at least one of the sub slidable plates.

7. The liquid crystal display device according to claim 6, wherein the adjusting device passes through the base plate to be in contact with the sidewall of at least one of the sub slidable plates.

8. The liquid crystal display device according to claim 7, wherein the base plate includes:
   a base plane; and
   a base sidewall vertically extending from the base plane, the adjusting device passes through the base sidewall of the base plate to be in contact with the sidewall of the sub-plane.

9. The liquid crystal display device, according to claim 6, wherein the adjusting device is at least one screw.

10. The liquid crystal display device according to claim 1, wherein the case includes a support frame for accommodating the liquid crystal display panel, the bottom cover being located at a bottom side of the support frame.

11. A liquid crystal display device, comprising:
    a liquid crystal display panel;
    a case for supporting the liquid crystal display panel; and
    a cover being combined with the case,
    wherein the cover includes:
      an outer plate having a fixed size; and
      an inner plate for accommodating the liquid crystal display panel, the inner plate being surrounded by the outer plate,
    wherein the inner plate has an adjustable size based on a size of the liquid crystal display panel and at least one groove along a sliding direction of the inner plate, and
    wherein the outer plate includes at least one protrusion through the at least one groove, a slidable range of the slidable plate being limited by a length of the groove.

12. The liquid crystal display device according to claim 11, wherein the inner plate is horizontally slidable on the outer plate to adjust the size of the inner plate.

13. The liquid crystal display device according to claim 12, wherein the inner plate includes a plurality of sub slidable plates, each of the sub slidable plates being slidable independently.

14. The liquid crystal display device according to claim 13, wherein each of the sub slidable plates includes:
    a sub-plane horizontally slidable on the outer plate; and
    a sidewall vertical extending from the sub-plate.

15. The liquid crystal display device according to claim 14, further comprising:
    an adjusting device on the outer plate, the adjusting device being in contact with the sidewall of at least one of the sub slidable plates to horizontally slide the at least one of the sub slidable plates.

16. The liquid crystal display device according to claim 15, wherein the adjusting device passes through the outer plate to be in contact with the sidewall of at least one of the sub slidable plates.

17. The liquid crystal display device according to claim 16, wherein the adjusting device is at least one screw.

18. The liquid crystal display device according to claim 16, wherein the outer plate includes:
    a base plane; and
    a base sidewall vertically extending from the base plane, the adjusting device passes through the base sidewall of the outer plate to be in contact with the sidewall of the sub-plane.

19. The liquid crystal display device according to claim 11, wherein the case includes a support frame for accommodating the liquid crystal display panel, the cover being located at a bottom side of the support frame.

* * * * *